2,892,370

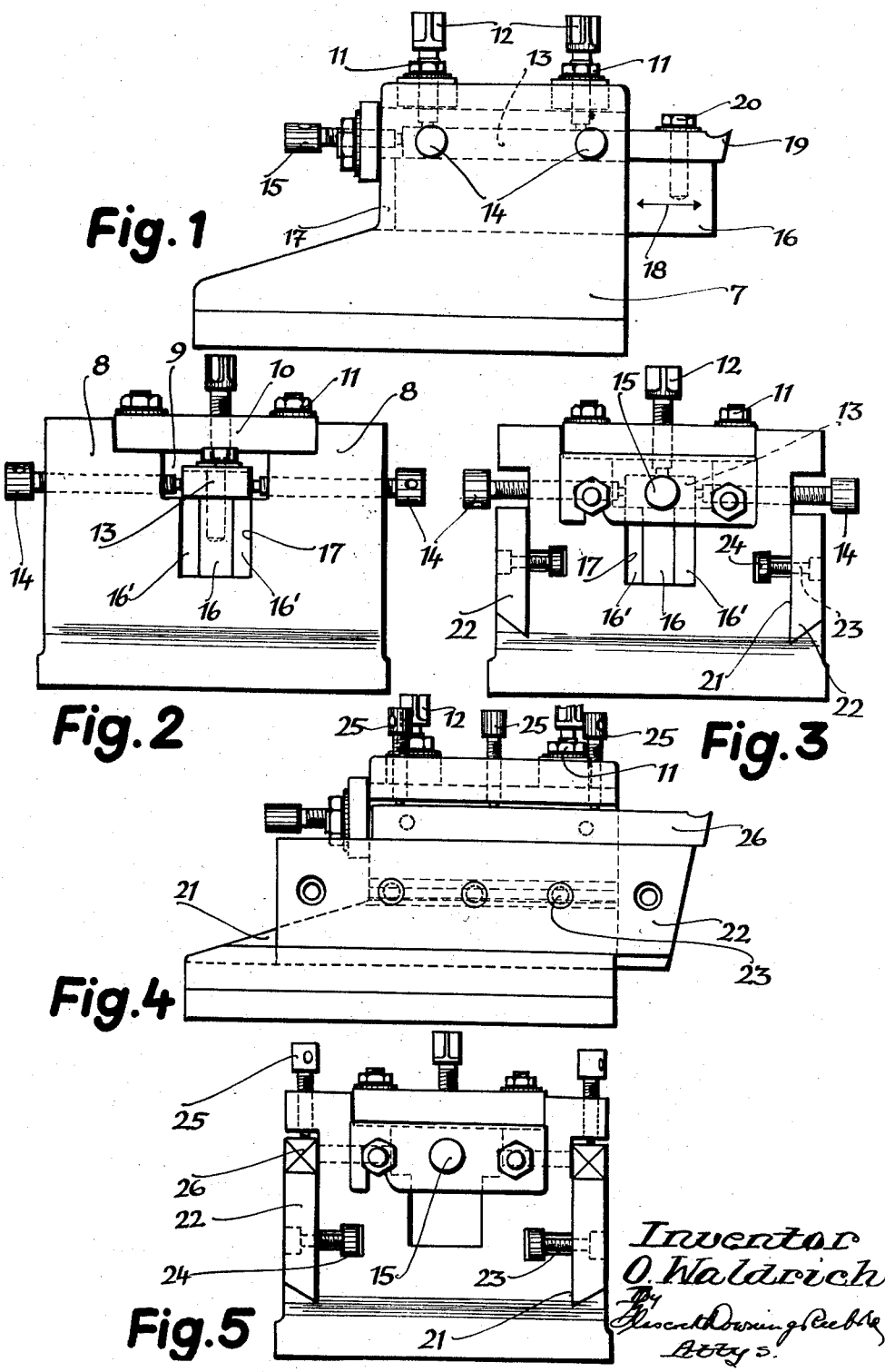
June 30, 1959     O. WALDRICH     2,892,370
TOP SLIDE CONSTRUCTION FOR HEAVY LATHES
Filed Nov. 15, 1954

United States Patent Office

Patented June 30, 1959

2,892,370

TOP SLIDE CONSTRUCTION FOR HEAVY LATHES

Oskar Waldrich, Siegen, Westphalen, Germany

Application November 15, 1954, Serial No. 468,933

Claims priority, application Germany November 28, 1953

2 Claims. (Cl. 82—36)

The present invention relates to the machine tool art and is particularly directed to improvements in the construction of what is termed top slides for heavy lathes.

The invention is further related to a top slide construction for lathes used in machining grooved rolls such as are used in rolling mills.

The machining of such grooved rolls has been previously effected by using a finishing tool which produces the shape of the groove and which is clamped in an exchangeable tool post or tool holder on the lathe.

The tool holder or tool box is formed by the top slide of the lathe which in turn is secured to a cross slide, the latter being movable transversely to the axis of the workpiece on the carriage that is movable longitudinally of the workpiece. Other constructions are known in which the top slide itself is the cross slide that is moved directly over the longitudinal carriage. The tool post consists of a block which carries a plurality, usually three, clamping screws that pass through the top plate of the tool box for clamping a tool thereto, the tool having been inserted laterally into or under the block.

When what is known as a tool box is used, the top slide is constructed substantially in U-form with the limb extending upwardly from the web of the U and lying at a 90° angle to the axis of the workpiece. The groove thus formed is closed by a bridge carrying a heavy clamping screw. The tool is inserted into the groove from the workpiece end and is clamped in position. Adjusting screws may be provided to manipulate the tool in the tool box.

Machining of a roll is then effected by first mounting a roughing tool on a tool post and effecting the rough machining operations and thereafter mounting the finishing tool in a tool box, the finishing tool being fed toward the workpiece until it engages the same and fine machining being effected by adjustments of the tool.

For effecting economy in the machining of grooved rolls, it is of great importance that the tool be supported as well as possible. For this reason, tool supports have been used which are screwed to the top slide or cross slide and which support the length of the tool shank that projects from the slide, that is, that part of the tool projecting from the tool box or tool post. The tool support must be selected in accordance with the length of the projection of the tool relative to the slide and where necessary, the tool support must be changed and again screwed firmly into position.

The present invention has for an object therefore to provide an improved top slide construction which eliminates the need of varying sized tool supports or braces.

As a further object, the invention provides an improved top slide construction in which the tool and tool support are coupled for simultaneous movement toward the workpiece independently of the movement of the top slide in a manner permitting angular adjustments of the tool relative to the top slide.

According to the invention, a tool support is combined as a unit with the tool by providing a horizontal guideway in the top slide and mounting therein the tool support and tool.

From one aspect, the invention comprehends an arrangement in which the support and the tool can be rocked about an axis lying between the cutting edge of the tool and the clamping point, the two parts, that is tool and support, being separable. The arrangement can be further developed by constructing the tool support of rectangular form and guiding the same in the top slide or further including means for longitudinally adjusting the position of the tool support in the top slide.

If the tool support is to be guided with the play in the top slide, a separate pivotal motion between the tool and its support or brace must be provided. For this purpose the invention contemplates the provision of a screw or stud passing through the tool and socket in the tool support. This screw or stud constitutes a pivot pin and is disposed between the cutting edge of the tool and the point at which the clamping force is applied. Thus if the clamping force that holds the tool in the slide is released, the tool support moves with the tool when the latter is moved back and forth in the tool box in the top slide and when the clamping force is re-applied the tool support is simultaneously clamped in position with the tool.

The arrangement further provides a tool support that is particularly efficacious because it can be guided over a considerable length of the top slide.

It is to be pointed out that the invention also contemplates an arrangement in which the tool and tool support form a rigid unit with provision being made so that the tool support can be rocked simultaneously with the tool in the top slide about an axis lying between the cutting edge and the point of clamping force. Further provision must be made for suitably guiding the tool support in the top slide so that despite any rocking motion imparted to the tool support the bending movement can be taken up by the top slide without play.

With such an arrangement, the machining of grooves in heavy rolls can be effected with the support of the tool being substantially more effective and rigid so that the machine surfaces have a better finish whereby any subsequent grinding operations are less time consuming.

The same concept of utilizing a tool support that is longitudinally movable in a top slide in conjunction with the tool can also be used in the case of a tool post if grooves are provided in the two side surfaces of the top slide with the tool supported and a superposed tool being arranged in the grooves and clamped in position by a plurality of clamping screws. However, in order to prevent lateral shifting of the tool support in this arrangement, it is desirable that the engagement between the tool and tool support be such that it does not permit any swinging movement by any relative longitudinal movement since these tools are only roughing tools and do not require a swinging motion. Thus the tool support is clamped laterally to the top slide by horizontal screws.

It is further to be understood that the clamping action can be effected by means other than screws. Particularly it is contemplated to maintain a connection between the tool and the tool support or brace and to provide clamping means for the tool support or brace which will permit the same to assume any desired longitudinal position in the top slide.

Further and more specific objects will be apparent from the following description taken in connection with the accompanying drawings, in which:

Figure 1 is an end elevational view of an improved top slide construction,

Figure 2 is a front elevational view of the arrangement of Figure 1,

Figure 3 is a rear elevational view of a modified form of top slide incorporating tool supports for roughing tools, Figure 4 is a side elevational view of the arrangement of Figure 3 with the roughing tools in operative position, and Figure 5 is a rear view of the arrangement of Figure 4.

As illustrated in the form shown in Figure 1, the top slide 7 includes the upwardly extending limbs 8. The inner surfaces of these limbs are shouldered at different levels. At the upper level there is applied a bridge piece 10 which is secured to the limbs 8 by the screw and nut connections 11. In the center of the bridge piece are disposed clamping screws 12. These screws pass through the bridge piece applying clamping force to the top of a tool 13. Beneath the tool 13 is the tool support or brace 16 which is of rectangular cross section and longitudinally adjustable in the recess 17 formed between the limbs 8 in the direction of the arrow 18. Packing members 16' are disposed on opposite sides of the tool support or brace 16 to prevent any rocking or swinging motion of this support. A pair of adjusting screws 14 pass through the limbs 8 at a level with the tool 13 so that in the intermediate portion of the space between the limbs the tool 13 can be rocked about a vertical axis by manipulation of the screws 14 to provide for angular adjustments of the tool. To effect fine machining these screws 14 are also lateral clamping screws and a further adjusting screw 15 passes through the rear cover plate on the top slide, it being clear that manipulation of this screw when the screws 14 and 12 are backed off will provide longitudinal movement of the tool in the recess between the limbs 8.

If desired, the packing member 16' can be made of wedge form to serve as clamping members or for adjustment.

When machining is carried out in the usual manner by adjusting of the screws 14, the tool support remains in the same position. As indicated, as soon as screws 14 and 12 have been loosened, the tool can be drawn out of the recess with the tool support moving with it. The length of the tool that is supported by the tool support is thus in contradistinction to known tool supports, always the same and the tool is effectively supported without the necessity of exchanging the support. It is to be pointed out that the screw 20 which passes through the tool and engages in the recess of the support forms a pivot pin between the cutting edge 19 and the clamping screw 12 nearest the cutting edge so that swinging movement of the tool in relation to the tool support is possible. This connection ensures the conjoint movement of the tool and its support in the direction longitudinal of the top slide.

It is thus clear that the top slide of this invention incorporates means whereby a tool and underlying tool support can be moved simultaneously toward and away from the workpiece with the clamping means that apply vertical force to the tool also clamping the support to the top slide and in which the top slide has a recess accommodating the tool and support which has a wider portion at the level of the tool whereby the tool can move angularly relative to the axis of the support. It is clear from Figure 1 that the tool support is substantially as long as the tool and that the tool will always be adequately supported.

Figure 3 illustrates a modified form of top slide which is provided with lateral grooves 21 having angular bottoms which receive further tool supports 22. These tool supports can be clamped in any desired longitudinal position by means of lateral or horizontal clamping screws 23 cooperating with nuts 24 mounted in T-shaped slots in the body of the top slide. The angular relation or inclination of the bottom face of the recess cooperates with a similarly angled or inclined face on the tool supports 22 so that with the tool resting on the top of the tool supports the clamping pressure applied by top clamping screws tends to press the tool support more firmly against the side of the top slide. In Figure 3 the structure is illustrated with only the finishing tool 13 in position and no roughing tools resting on the tool supports 22.

When roughing tools 26 are to be used, the structure presents the appearance of Figures 4 and 5 in which the tool supports 22 are firmly clamped in position by the screws 23 and the tools 26 that rest upon the top of the tool supports are firmly clamped in position by screws 25 which correspond to the clamping screws 12 that hold the finishing tool. It will be noted that when a roughing tool is in use the finishing tool is not in use and screws 14 are, therefore, not required and are removed to provide space for the roughing tool.

It is further to be pointed out that the tool support or brace which is at least of substantial rectangular cross section has a length that exceeds that of the tool with the outer end of the support being located at least closely adjacent the cutting edge of the tool.

The invention further provides an elongated bearing surface for the tool support for proper transmission of stress set up during working.

It is believed clear that as shown in Figure 1 the tool is releasably coupled to the tool support 16 by the pin or screw 20.

What is claimed is:

1. A top slide construction for lathes comprising spaced upright limbs, a bridgepiece extending between the limbs, secured thereto and defining with the limbs a recess, said recess having a flat bottom, a lower portion and an upper portion having a width greater than the width of the lower portion, a beam-like tool support of rectangular cross section disposed in the lower portion of the recess, said beam-like element being of such a length that it is received in the entire groove length when projecting to its greatest extent toward the workpiece, a tool in the upper portion of the recess and bearing on said support, said tool and support having a length greater than the length of the recess so that they protrude beyond the top slide toward the workpiece, common clamping means carried by the bridgepiece for clamping the tool to the support and the support to the flat bottom, pin means passing through the tool and disposed in the support beyond the outer end of the slide, means for adjusting the tool and thus the support longitudinally of the recess, and means for adjusting the tool angularly of its axis in the upper portion of the recess.

2. A top slide construction for lathes comprising spaced upright limbs, a bridgepiece extending between the limbs, secured thereto and defining with the limbs a recess, said recess having a flat bottom, a lower portion, and an upper portion having a width greater than the width of the lower portion, a beam-like tool support of rectangular cross section disposed in the lower portion of the recess, said beam-like element being of such a length that it is received in the entire groove length when projecting to its greatest extent toward the workpiece, a tool in the upper portion of the recess and bearing on said support, said tool and support having a length greater than the length of the recess so that they protrude beyond the top slide toward the workpiece, common clamping means carried by the bridgepiece for clamping the tool to the support and the support to the flat bottom, means for adjusting the tool and thus the support longitudinally of the recess, and means for adjusting the tool angularly of its axis in the upper portion of the recess.

References Cited in the file of this patent

UNITED STATES PATENTS

| 517,167 | Pratt | Mar. 27, 1894 |
|---|---|---|
| 810,238 | Waite | Jan. 16, 1906 |
| 1,032,898 | Hane | July 16, 1912 |

(Other references on following page)

UNITED STATES PATENTS

| | | |
|---|---|---|
| 1,187,099 | Rogers | June 13, 1916 |
| 1,467,175 | Kramer | Sept. 4, 1923 |
| 1,493,051 | O'Brien | May 6, 1924 |
| 1,863,131 | Taylor | June 14, 1932 |
| 1,935,493 | Wellington | Nov. 14, 1933 |
| 2,188,917 | Poorman | Feb. 6, 1940 |
| 2,239,166 | Carr | Apr. 22, 1941 |
| 2,254,056 | Anthony | Aug. 26, 1941 |
| 2,369,875 | Wanelik | Feb. 20, 1945 |
| 2,475,049 | Premo | July 5, 1949 |
| 2,658,418 | Hoelscher | Nov. 10, 1953 |

FOREIGN PATENTS

| | | |
|---|---|---|
| 25,382 | Great Britain | A.D. 1913 |
| 522,968 | Great Britain | July 2, 1940 |
| 556,516 | Great Britain | Oct. 7, 1943 |